(12) United States Patent
Wu

(10) Patent No.: US 6,793,231 B2
(45) Date of Patent: Sep. 21, 2004

(54) LEG SUPPORT OF A TRICYCLE FOR CHILDREN HAVING A CYCLE FRAME

(75) Inventor: Jung-Jyh Wu, Kaohsiung (TW)

(73) Assignee: TCV Industrial Co., Ltd., Kaohsiung (TW)

(*) Notice: Subject to any disclaimer, the term of this patent is extended or adjusted under 35 U.S.C. 154(b) by 0 days.

(21) Appl. No.: 10/327,002

(22) Filed: Dec. 24, 2002

(65) Prior Publication Data

US 2003/0122346 A1 Jul. 3, 2003

(30) Foreign Application Priority Data

Dec. 31, 2001 (TW) .................................. 90224789 U

(51) Int. Cl.[7] .............................................. B62H 1/08
(52) U.S. Cl. ...................................... 280/291; 280/282
(58) Field of Search ............................ 280/291, 208.4, 280/282, 163, 166

(56) References Cited

U.S. PATENT DOCUMENTS 3,954,283 A * 5/1976 Boehm et al. .............. 280/273
4,895,379 A * 1/1990 Kelly ............................ 280/7.1
5,979,269 A * 11/1999 Su-Chen ...................... 74/564
6,161,847 A * 12/2000 Howell et al. ................ 280/30

FOREIGN PATENT DOCUMENTS

DE 3840908 A1 * 9/1989 ........... B62K/05/02

* cited by examiner

Primary Examiner—Kevin Hurley
(74) Attorney, Agent, or Firm—Leong C. Lei

(57) ABSTRACT

A leg support for a child tricycle having a cycle frame is disclosed. The leg support is characterized in that the cycle frame is provided with two spaced apart supporting board and the end edge of the supporting board is provided with a blocking board; and the top end of the leg support is pivotally mounted between the two supporting boards, and the length of a pivotal end of the leg support is adjustable such that the minimum length of the leg support allows the swinging of the leg support, and at the maximum length of the leg support the pivotal end urges the side edge or the bottom edge of the blocking board, providing the positioning of the leg support.

4 Claims, 8 Drawing Sheets

LEG SUPPORT OF A TRICYCLE FOR CHILDREN HAVING A CYCLE FRAME

BACKGROUND OF THE INVENTION (a) Technical Field of the Invention

The present invention relates to a leg support, and in particular, to a leg support mounted to the cycle frame of a tricycle for children, the leg support can be folded and extended for the supporting of the legs of the cyclist or user.

(b) Description of the Prior Art

A tricycle for children is provided with a front wheel axle eccentrically mounted with a pedal rod, allowing pedaling to rotate forward. However, most of the conventional tricycle does not provide a support for the legs of the user and therefore, it is rather unsafe if a leg support is not provided to the tricycle. Accordingly, it is an object of the present invention to provide a leg support for a child tricycle having a cycle frame which mitigates the above drawback.

SUMMARY OF THE INVENTION

Accordingly, it is an object of the present invention to provide a leg support of a child tricycle having a cycle frame, characterized in that the cycle frame is provided with two spaced apart supporting boards and the end edge of the supporting boards is provided with a blocking board; and the top end of the leg support is pivotally mounted between the two supporting boards, and the length of a pivotal end of the leg support is adjustable such that the minimum length of the leg support allows the leg support to swing, and at the maximum length of the leg support the pivotal end urges the side edge or the bottom edge of the blocking board, providing the positioning of the leg support.

Yet another object of the present invention is to provide a leg support of a child tricycle having a cycle frame, a connection tube mounted onto two supporting boards of the tricycle frame and an opening edge of the tube is provided with a lug and the tube wall of the connection tube is provided with two corresponding opened slots; an elastic element being insertable into an inner hole of the mounting tube; a support rod having a T-shaped or a vertical rod and a horizontal rod, and the vertical rod is connected at the inner hole of the mounting tube, and the end section of the vertical rod is provided with a through hole, and a pedaling board mounted at the two ends of the horizontal rod of the supporting rod.

A further object of the present invention is to provide a leg support of a child tricycle having a cycle frame, wherein the two ends of the horizontal rod are pivotally mounted to the pedaling board and a connection tube is used for the connection of the horizontal rod and the pedaling board, wherein the connection tube is connected to the two end heads of the horizontal rod, and the end of the connection tube is tapered to form an urging rod; the inner end face and top end face of the pedaling board is provided with an arch-shaped end face and a first hole and a second hole are provided at the horizontal and vertical position of the arch-shaped end face, and a tapered passage is formed from the first hole to the second hole.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
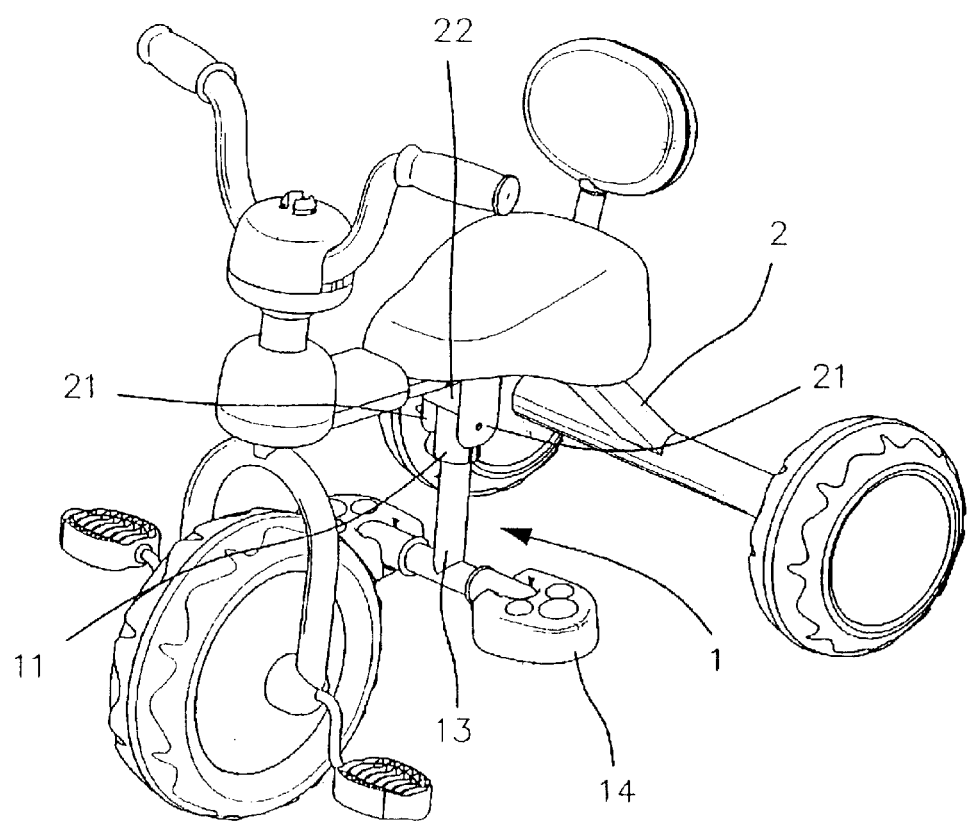
FIG. 1 is a perspective view of the present invention.
Figure 2:
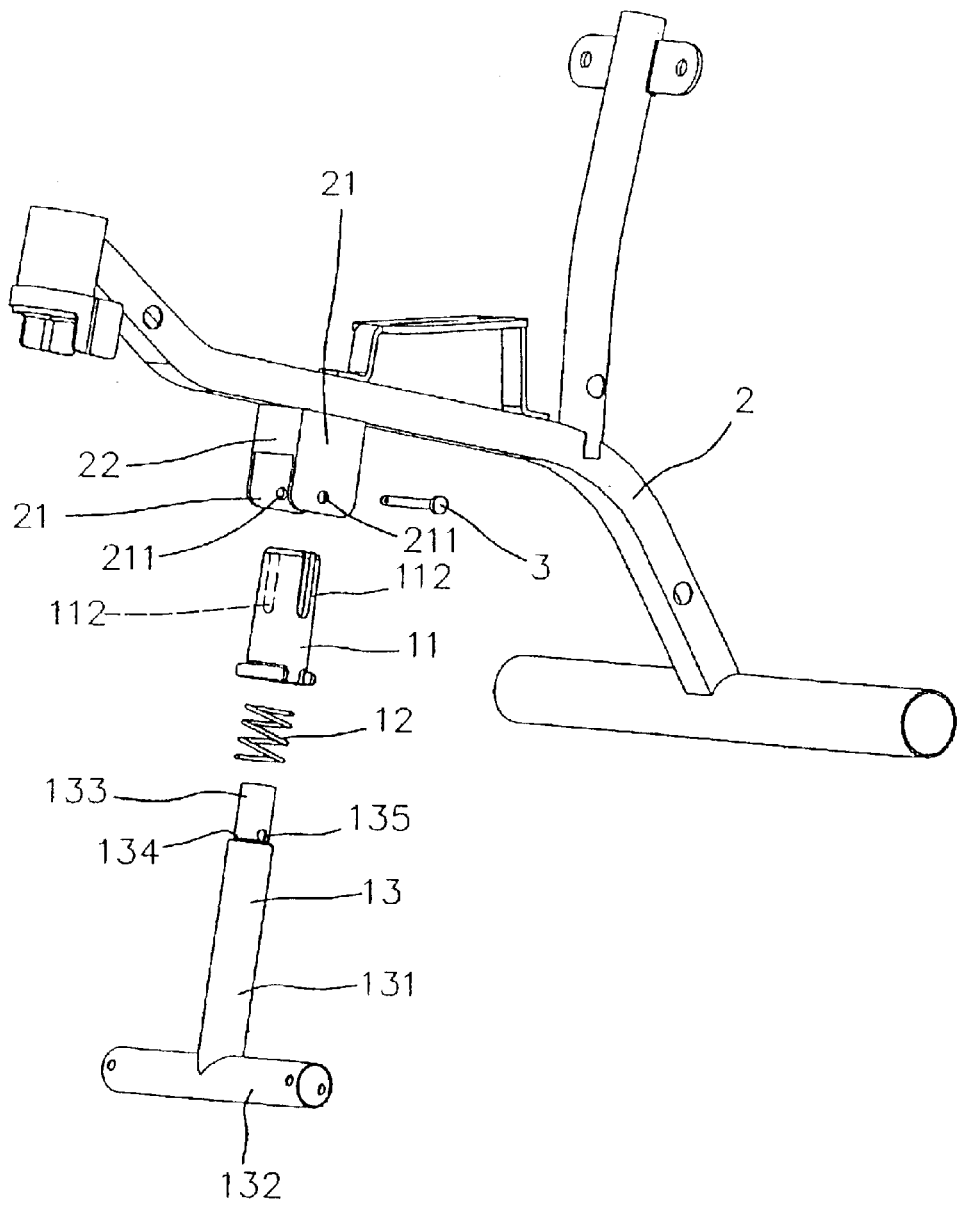
FIG. 2 is an exploded perspective view of the present invention.
Figure 3:
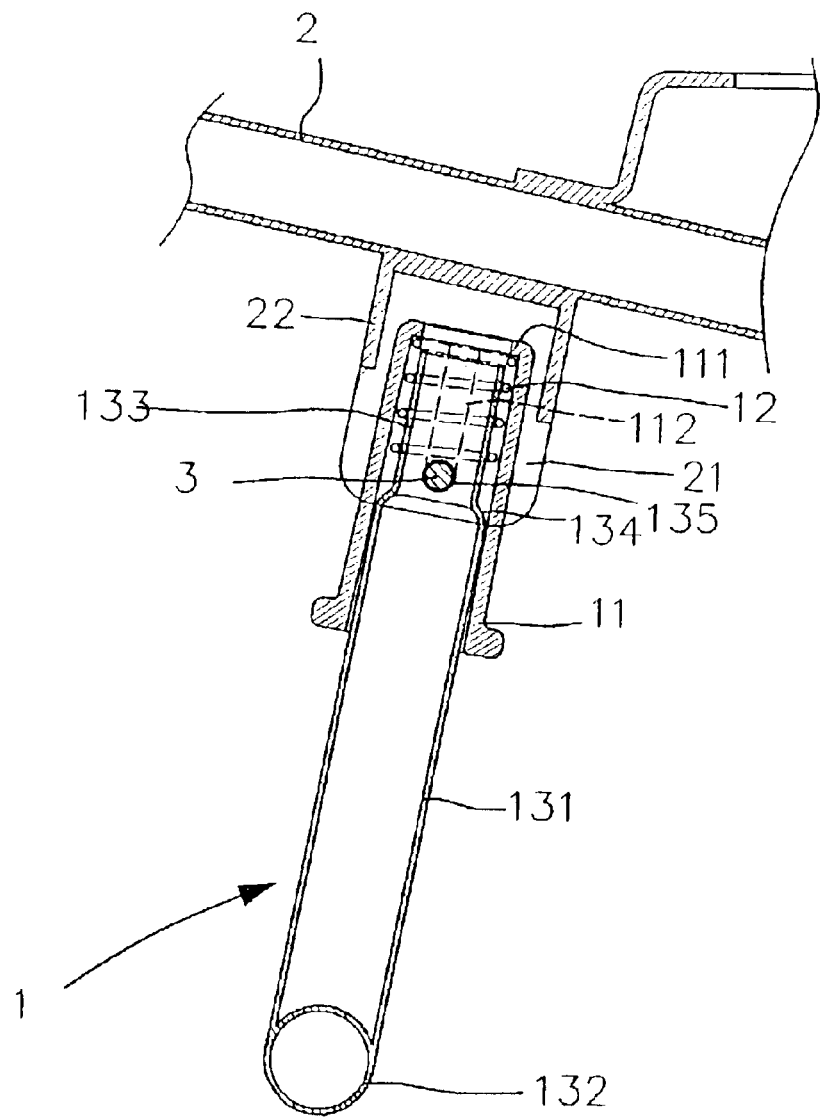
FIG. 3 is a sectional view of the leg support in accordance with the present invention.

Referring to FIGS. 1 to 3, there is shown a leg support 1 of a tricycle for children which is positioned to the tricycle frame 2 at the lower section of the seat of the tricycle. The pivotal position of the leg support 1 is a support board 21. The position at the lower section of the support board 21 is provided with pivotal hole 211. The position at the upper section of the two support boards 21 is connected to a blocking board 22, and the height of the blocking board 22 is lower than that of the position of the pivotal hole 211.

In accordance with the present invention, the leg support 1 comprises a connection tube 11, an elastic element 12, a support rod 13 and two pedaling boards 14. The connection tube 11 is secured between the two support boards 21, and the upper end opening edge of the tube is provided with a protruded lug 111. The tube wall of the connection tube 11 is provided with a corresponding opened slot 112. The elastic element 12 can be placed into an inner hole of the connection tube 12 and is urged by the lug 111.

The support rod 13 is an inverted T-shape and comprises a vertical rod 131 and a horizontal rod 132. The vertical rod 131 can be mounted into the inner hole of the connection tube 11, and the end section of the vertical rod 131 is a stepped structure having an extended section 133 and a vertical end face 134. When the extended section 133 is connected to the connection tube 11, it will pass out of the inner hole of the lug 111, and the gap formed by the inner wall of the connection tube 11 and the extended section 133 provides a location for the element 12. Further, the upper section of the vertical rod 131 is provided with a through hole 135 and the distance between the end of the vertical rod 131 and the through hole 135 must be smaller or equal to that between the pivotal hole of the support board 21 and the bottom edge of the blocking board 22 such that after the pivotal connection of the support rod 13 and the support board 21 the end of the vertical rod 131 of the support rod 13 will not urge the blocking board 22 so that the independent support rod 13 can swing freely. The pedaling board 14 is connected at the two ends of the horizontal rod 132.

After the mounting of the connection tube 11 and the support rod 13 together with a spring 12 to form a leg support 1, a peg 3 is inserted into the pivotal hole 211 of the support board 21, the opened slot 112, and the through hole 135. At this instance, one end of the elastic element 12 urges the peg 3, one end of the elastic element 12 urges the lug 111 such that under an external driving force the elastic element 12 will restore and retrieve downward. The length of the opened slot 112 shall allow the top edge of the connection tube 11 to be higher than the end edge of the vertical rod 131.

When the leg support 1 is at the lower section of the triangle frame 2, the correction tube 11 urges the end face of the blocking board 22. Thus, the leg support 1 is positioned and the legs of the user, especially the child, can be placed thereon.

Figure 4:
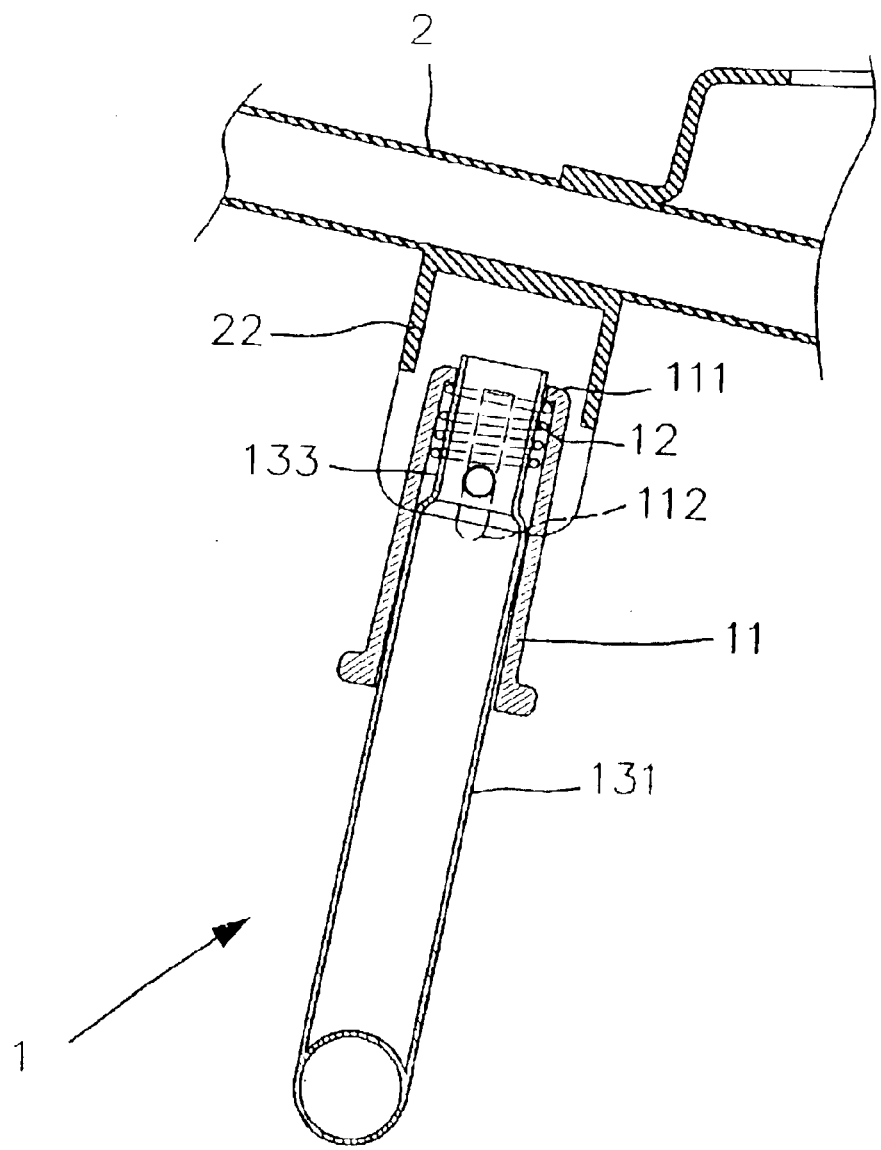
FIG. 4 is a schematic view showing the action of FIG. 3 in accordance with the present invention.
Figure 5:
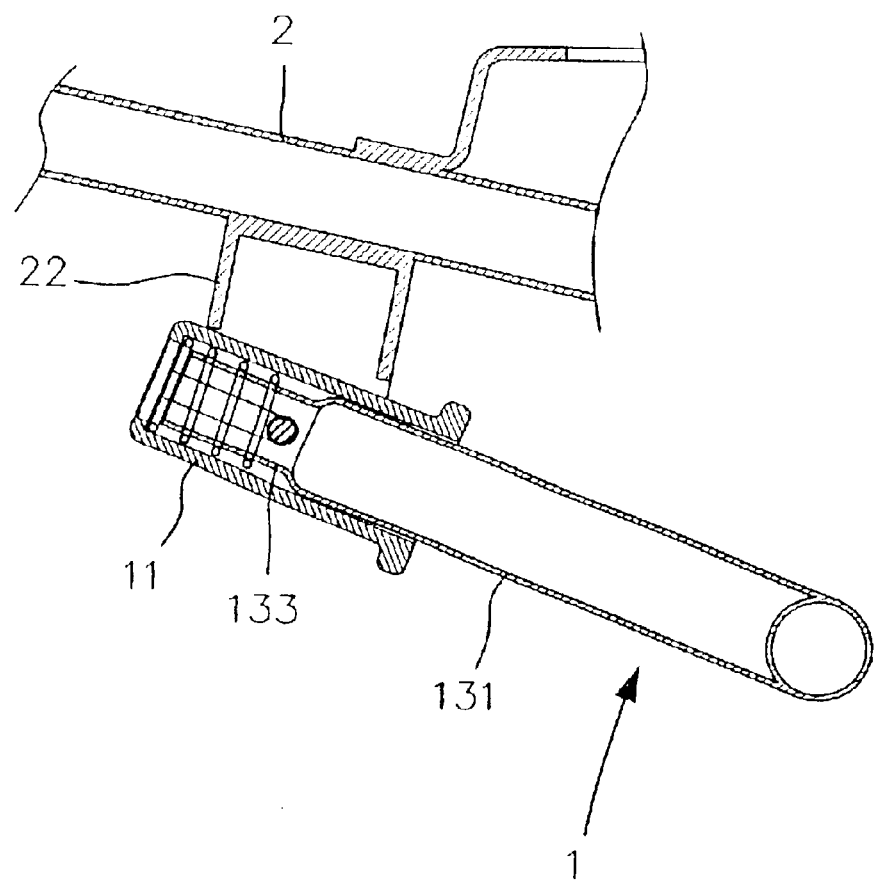
FIG. 5 is a schematic view showing the folding action of FIG. 4 in accordance with the present invention.

If the leg support 1 is not to be used, the connection tube 11 is to be moved to position below the vertical rod 131 such that the end of the vertical rod 131 is located at the opening of the lug 111 and the connection tube 11 is positioned at the lower section of the top end of the vertical rod 131 (as shown in FIG. 4). Thus, the leg support 1 is free to swing, so that when the leg support 1 rotates to an appropriate angle, the connection tube 11 is protruded at the top edge of the end of the vertical tube 131 and the top wall of the connection tube 11 urges the bottom edge of the blocking board 22 (as shown in FIG. 5). At this instance, the leg support 1 cannot be moved.

Figure 6:
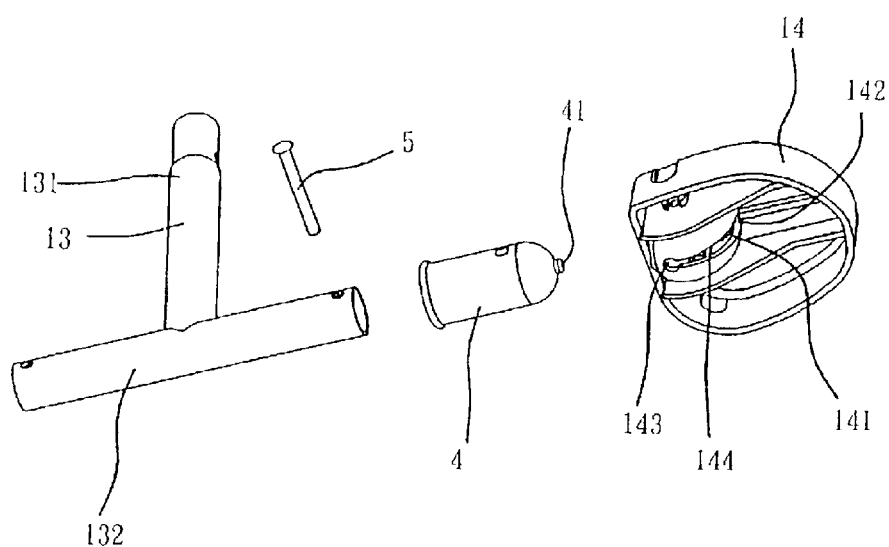
FIG. 6 is a schematic view showing the assembly of the supporting rod and the pedaling board in accordance with the present invention.

As shown in FIG. 6, between the horizontal rod 132 and the pedaling board 14, a pivotal position is provided for the connection tube 4 which can be mounted to the two ends of the horizontal rod 132. The end of the connection tube is a spherical shaped structure and one end of the structure is an urging element 41.

Figure 7:
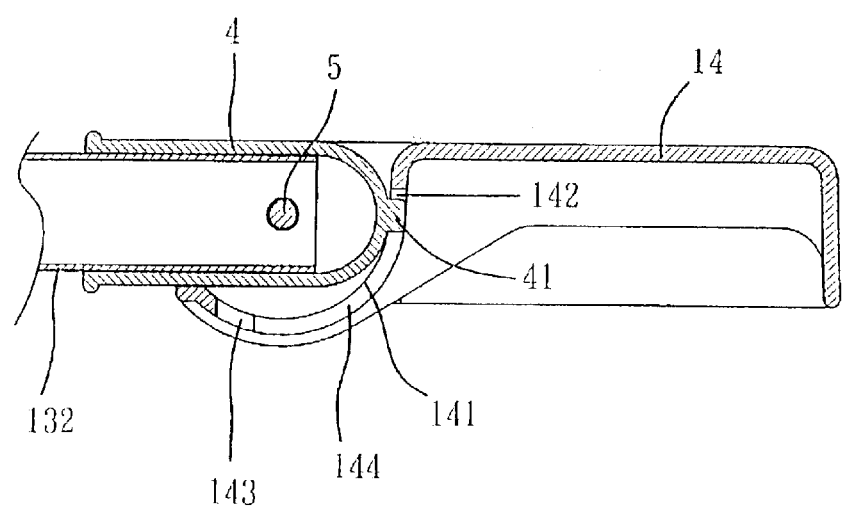
FIG. 7 is a sectional view of the combination of the supporting rod and the pedaling board in accordance with the present invention.

As shown in FIG. 7, the inner end face of the pedaling board 14 and the top end face is an arch-shaped end face 141, and there is a first hole 142 and a second hole 143 for the adaptation of the urging element 41 formed at the horizontal and vertical position of the arch-shaped end face 141. A tapered passage 144 is formed between the first hole 142 and the second hole 143.

Figure 8:
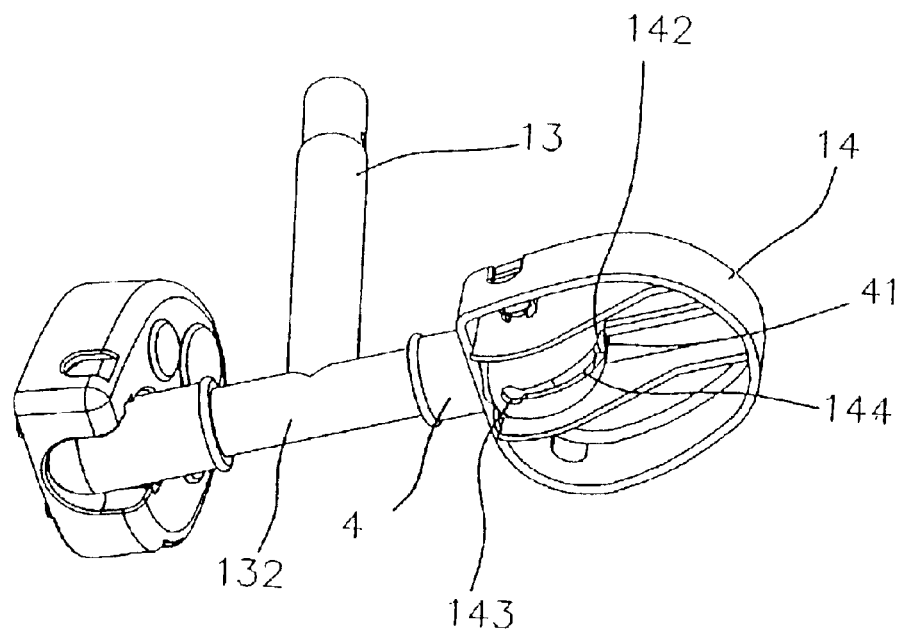
FIG. 8 is a schematic view showing the horizontal position of the pedaling board in accordance with the present invention.

After the connection tube 4 has been connected to the ends of the horizontal rod 132, the pedaling board 14 makes use of a peg 5 to pivot to the two ends of the horizontal rod 132. When the pedaling board 14 is placed in horizontal, the top of the connection tube 4 is located at the first hole 142 (as shown in FIG. 8) so that the user can place his legs onto the pedaling board 14.

Figure 9:
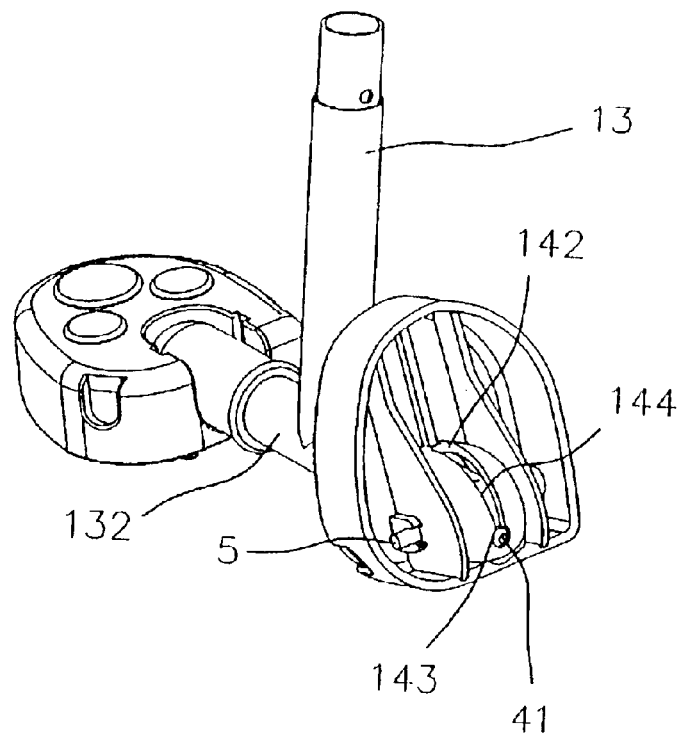
FIG. 9 is a schematic view showing the folded pedaling board in accordance with the present invention.

When the pedaling board 14 is folded, the urging element 41 will be positioned along the passage 44 and the urging element 41 will force into the second hole 143 (as shown in FIG. 9), and the pedaling board 14 is folded in a vertical configuration.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A leg support for a child tricycle having a cycle frame, characterized in that the cycle frame is provided with two spaced apart supporting boards and an end edge of the supporting boards is provided with a blocking board; and a top end of the leg support is pivotally mounted between the two supporting boards, and a length of a pivotal end of the leg support is adjustable such that a minimum length of the leg support allows swinging of the leg support, and at a maximum length of the leg support, the pivotal end urges a side edge or a bottom edge of the blocking board, providing positioning of the leg support.

2. The leg support of claim 1, further comprising a connection tube mounted onto said two supporting boards of the tricycle frame and an opening edge of the connection tube is provided with a lug and a tube wall of the connection tube is provided with two corresponding opened slots, an elastic element insertable into an inner hole of the connection tube; a support rod having a T-shape comprising a vertical rod and a horizontal rod and the vertical rod is connected at the inner hole of the connection tube, and an end section of the vertical rod is provided with a through hole, and pedaling boards are mounted at two ends of the horizontal rod of the support rod.

3. The leg support of claim 1, wherein two ends of the horizontal rod are pivotally mounted to the pedaling boards and a connection tube is used for connection of the horizontal rod and the pedaling boards, wherein the connection tube is connected to two end heads of the horizontal rod, and an end of the connection tube is tapered to form an urging rod, an inner end face and a top end face of the pedaling boards are provided with an arch-shaped end face, and a first hole and a second hole are provided at horizontal and vertical positions of the arch-shaped end face, and a tapered passage is formed from the first hole to the second hole.

4. The leg support of claim 2, wherein an end of the connection tube has a tapered spherical surface.

* * * * *